United States Patent [19]

Bergstrom

[11] 3,788,486
[45] Jan. 29, 1974

[54] FILTER

[75] Inventor: Theodore R. Bergstrom, Little Canada, Minn.

[73] Assignee: Minnesota Mining and Manufacturing Company, St. Paul, Minn.

[22] Filed: Sept. 30, 1971

[21] Appl. No.: 185,270

[52] U.S. Cl................................ 210/496, 210/510
[51] Int. Cl............................................. B01d 27/02
[58] Field of Search... 210/496, 497, 510, 455, 477, 210/483, 323, 500, 504, 506

[56] References Cited
UNITED STATES PATENTS

| | | | |
|---|---|---|---|
| 532,939 | 1/1895 | Balch | 210/496 X |
| 3,581,902 | 6/1971 | Bidler | 210/496 |
| 2,160,571 | 5/1939 | Bates | 210/496 X |
| 2,007,052 | 7/1935 | Howe | 210/510 |
| 3,524,548 | 8/1970 | McDonald et al. | 210/496 |

Primary Examiner—Samih N. Zaharna
Assistant Examiner—T. A. Granger
Attorney, Agent, or Firm—Harold J. Kinney et al.

[57] ABSTRACT

A rigid filter, useful for example for filtering molten thermoplastic resin as it is forced through a spinnerette head, comprising a rigid block of shaped uniformly permeable material, having continuity and identity of composition and having increased filtering capacity, with a plurality of filtration cavities extending into the block from the top surface and a plurality of drainage cavities extending into the block from the bottom surface.

7 Claims, 3 Drawing Figures

PATENTED JAN 29 1974　　3,788,486
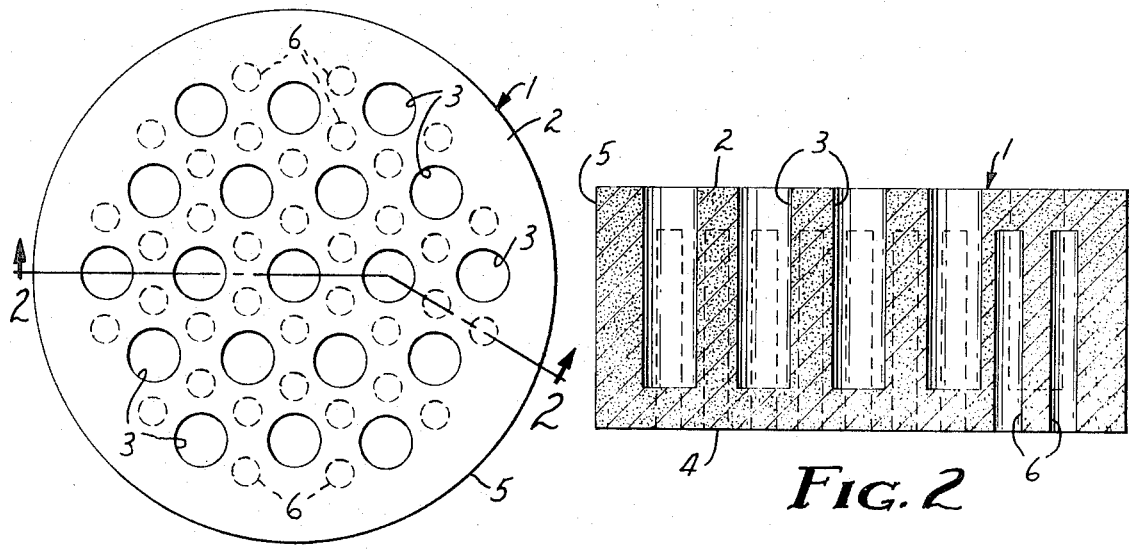
FIG. 1
FIG. 2
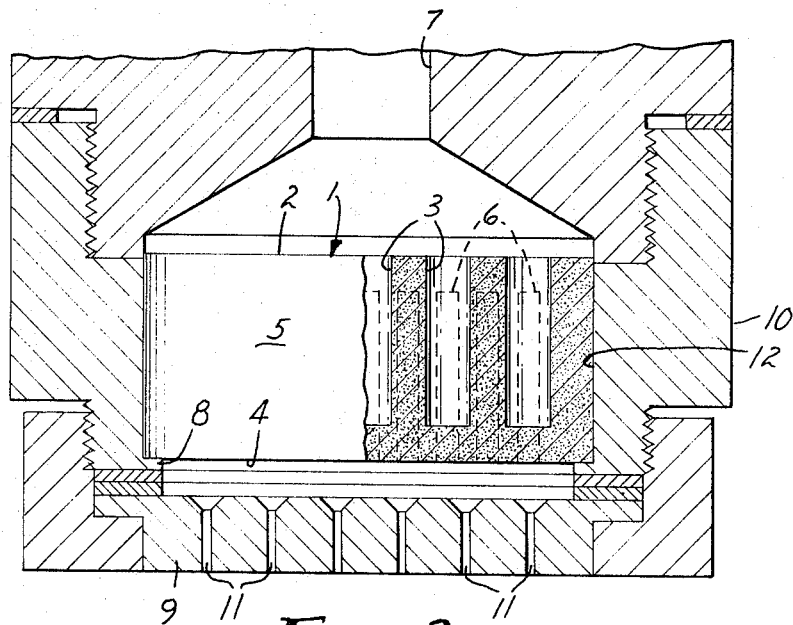
FIG. 3
INVENTOR.
THEODORE R. BERGSTROM
BY Kinney, Alexander,
Sell, Steldt & DeLaHunt
ATTORNEYS

FILTER

This invention relates to filters made from consolidated particulate materials, such as sintered powdered metal or ceramics or glass beads.

In the spinning of molten thermoplastics to form fibers, it is known to place in the spinnerette head assembly a filter to remove solid particles and other inhomogeneities. Various filters have been proposed or used for this purpose, such as a body of sand (e.g., see U.S. Pat. No. 2,607,954, issued Aug. 26, 1952 to G. Schneider et al) or a filter made of metal plates with bore holes (e.g., see U.S. Pat. No. 2,792,122, issued May 14, 1957 to W. Munch et al), or a filter made of porous metal (e.g., see U.S. Pat. No. 3,295,161, issued Jan. 3, 1967 to L. H. Mott). Filters made from sintered powdered metal using powder metallurgy techniques have also been disclosed (see, for example, U. S. Pat. No. 3,570,059, issued March 16, 1971 to L. H. Mott). Though such filters have enjoyed some use, they inherently have a number of disadvantages. The prior art powdered metal filters generally require relatively thick elements to obtain needed strength at a sacrifice of flow rate or throughput, or require mechanical fastening of porous metal parts to each other. Some of the prior art filters, particularly those designed to have extended area filtering surface, have been found to be generally structurally weak and fragile at the thicknesses and micronic ratings required. This defect causes such filter structures to collapse in use under high pressure filtration. To overcome this weakness, necessary support members, such as support plates or breaker plates and screens, have been incorporated into the filter support structure, but the addition of supporting elements increases the cost of the filter structures and adds nothing to the filtering capabilities.

The filter of this invention is a physically rigid, uniformly permeable structure, having an extended area filtering surface, which does not have shortcomings of the prior art filters. Briefly, the filter of this invention is a shaped block of uniformly permeable material with top and bottom surfaces, the top surface having a plurality of filtration cavities extending into the body of the permeable block and providing an extended area filtering surface and the bottom surface having a plurality of drainage cavities extending into the porous block.

In the accompanying drawing,

FIG. 1 is a plan top view of one embodiment of the filter of this invention.

FIG. 2 is a sectional view of the filter of FIG. 1 taken along the plane 2–2.

FIG. 3 is a longitudinal section in partial section of a spinnerette head incorporating the filter of FIGS. 1 and 2. In the various figures, like reference numbers have been used to designate like parts.

Referring now to the accompanying drawing and initially to FIGS. 1 and 2, which show a preferred structure of this invention, reference number 1 generally designates a cylindrical block of rigid permeable material having a top surface 2 with a plurality of blind cylindrical filtration cavities 3 depending therefrom, said top surface and the surfaces defining said cavities providing an extended filter area or surface adapted to be exposed to the material to be filtered. The opposed lower surface 4 has a plurality of blind cylindrical drainage cavities 6 extending upwardly into the block.

The filtration cavities 3 and drainage cavities 6 of FIG. 1 are in parallel alignment and spaced apart in a hexagonal pattern. In the preferred embodiment shown in the drawing, each filtration cavity adjacent the outer wall 5 or periphery of the block has at least four equally spaced drainage cavities surrounding it and the non-peripheral filtration cavities have six equally spaced drainage cavities surrounding it to provide ready drainage from the filtration cavities. This configuration is the desirable pattern for the closest spacing of the cavities within a given volume while maintaining a distance between cavities sufficient to retain the integrity and strength of the filter during use. The close packing of filtration cavities 3 together with their depending geometry provides a maximum extended area filtering surface for a given thickness of filter. The cavities need not be formed as cylinders nor arranged in a hexagonal manner, and other suitable shapes of blind cavities and special arrangements will be apparent to effectuate desirable filtering and strength characteristics of the filter.

FIG. 3 shows a spinnerette head assembly having a feed duct 7 which can communicate with a suitable source of molten material to be supplied for filtering at a controlled rate and under high pressure. The filter of FIG. 1 is shown disposed within the filtration cavity 12 of the spinnerette retainer 10. The filter 1 can be separated from the spinnerette disk 9 by a void 8 to allow lateral flow of the filtered molten material to the spinnerette extrusion orifices 11.

In operation, the material to be filtered, such as a molten thermoplastic (e.g., polyester) at extrusion pressures as high as several thousand pounds per square inch, is fed through the feed duct 7 into the spinnerette head assembly. The molten plastic is forced against the extended area filtering surface presented by the top 2 and blind filtration cavities 3 of filter 1 and flows through the permeable walls thereof. The filtered material enters the drainage cavities 6, passes through the void 8 (or a screen, not shown) and is extruded through extrusion orifices 11 in the spinnerette head 9. The pressure on the filter 1 will be distributed to the step of the retainer 10. Where the outer vertical wall 5 of the filter is made with a downward and inward taper, the downward force on the filter block will be almost entirely transmitted to the spinnerette retainer 10.

The preferred materials for fabricating the filter of this invention are powdered metals, particularly austenitic stainless steel. Austenitic chromium-nickel stainless steels generally contain 16.0 to 26.0 weight percent chromium, 6.0 to 22.0 weight percent nickel, 0.03 to 0.25 (max.) weight percent carbon and occasionally some other elements added to develop certain specific properties, such as 1.75 to 4.00 weight percent molybdenum or small amounts of titanium, tantalum, and niobium to minimize formation of chromium carbides. Standard types of these steels have been assigned numbers and specifications by the American Iron and Steel Institute. These are generally known in the art as stainless steels of the AISI 300 Series. All of these AISI steels of the 300 Series are applicable in the practice of this invention. Of course, other powdered metals can be used in fabricating filters of this invention, such as nickel, tungsten, copper and the like, and alloys of such metals, including bronze, monel, etc. Particularly sintered ceramic materials or bonded glass beads can also be formed into a porous block and used in this invention.

The preferred filters are made from powdered metal which is relatively coarse so that upon sintering, the resulting shaped article will have the desired permeability or micronic rating. Powdered metal with mesh sizes in the range of −20+325 can be used, such as −200+325, −100+200, −50+100, −20+50, or blends thereof, can be selected to produce the desired micronic rating or bubble point, and to that end small amounts, e.g., 1–20 weight percent, of −325 mesh can be blended with the course powder, with the −50+325 mesh. (The term "mesh" referred to herein means mesh size according to U.S. Standard Sieve and "bubble point" a measure of the air pressure on one surface of a filter required to produce the first air bubble on the submerged opposite surface, corresponds to the absolute micronic rating of the filter as described in WADC T.R. 56–249 and MIL–F–8815B). The use of powdered metal with these mesh ranges will enable one to make filter structures in accordance with this invention with various micronic ratings, e.g., in the range of 1–150 microns. For purposes of making a filter having a very low micronic rating, e.g., less than 10 microns, powdered metal having a mesh size of −325 can be used.

In fabricating the filter from powdered metals, powdered metal of the desired mesh is blended with an organic heat-fugitive binder, such as those disclosed in U.S. Pat. Nos. 2,592,943, 2,709,651, and 2,902,363; the presently preferred binder is methyl cellulose in combination with a thermosetting epoxy. Solvents may be used in conjunction with these binders, such as water, as well as plasticizers, such as glycerin. The blending can be carried out in a conventional manner in various types of commercially available mixers, blenders, tumblers, and the like, care being taken to insure that the blend is homogeneous and the components are well dispersed. The resulting blend will be in the nature of a plastic mass or dough and will be similar in consistency to that of modeling clay. The plastic mass can be shaped in a suitable mold to the desired block configuration with the internal cavities and then dried to form a green structure, or the mass can be formed into a block and dried to form a green structure which is then shaped to the desired configuration by drilling filtration and drainage cavities and turning the block to the final shape or the use of other normal machining procedures.

The formed green structure is then heated in an oxygen-containing atmosphere to burn off the binder and then, the green structure is sintered under vacuum or a suitable atmosphere, such as a reducing atmosphere like hydrogen or dissociated ammonia. Sintering atmosphere, temperature, and the duration of sintering will depend upon the particular powdered metals being used, the selection of these conditions being within the skill of the art. In the case of austenitic stainless steels mentioned above, a hydrogen or dissociated ammonia atmosphere with a dew-point of −40° F. or lower and sintering temperatures in the range of 1200° to 1400° C., preferably 1250° to 1350° C., will be suitable, and the duration of sintering will usually be from 10 minutes to two or three hours.

The filter structure of this invention is entirely made in one piece of consolidated particulate materials without requiring wrought metal components. The filter has no press-fitted parts that could be dislodged nor are there any exposed protuberances which are subject to deformation or failure at high pressure differential filtration. An important advantage or feature of the filter of this invention is its rigid integral structure which enables the filter to withstand pressure differential stresses, and other forces normally encountered during operation, without being prone to the deformation, rupture, separation or other types of failure experienced with prior art filters which do not have the inherent features of this invention. This filter configuration eliminates the need for the breaker plate assembly normally required in filtering molten thermoplastic materials. The absence of a breaker plate reduces the dwell time of the molten polymer in the filtration cavity, thereby reducing the possibility of thermal degradation and gel formation. In spinnerette heads without a supporting structure, the height of the filter may be increased allowing deeper blind filtration cavities, resulting in greater filtration capacity due to the increase in the expanded surface of a deeper filter. This construction also will withstand reverse flow conditions and back-flushing cleaning operation without the likelihood of failure. Higher operating pressures can be used without fear that the filter structure will rupture or be deformed. It is generally desirable when operating under high pressure conditions to have a minimum wall thickness of 1/16 inch between the filtration cavities and the drainage cavities to prevent a failure of the filters due to collapse.

The unique structure of this filter allows the filtration of molten thermoplastic material such as polyester resins. The filter structure of this invention will produce high quality filtered material suitable for application in magnetic tape or synthetic fiber which require a filtered material with a high degree of uniformity and free of unmelted solids.

The objects and advantages of this invention are further illustrated by the following examples, but particular materials and amounts recited in this example, as well as other conditions and details, should not be construed to unduly limit this invention.

EXAMPLE 1

An extended surface area filter similar to that shown in FIG. 1 was prepared by first mixing 1425 grams of −100+200 mesh austenitic chromium-nickel stainless steel powder (M.I. 316L), 75 grams molybdenum (Fisher No. of about four microns), 49.6 grams of 4000 cps. methylcellulose ("Methocel"). The resulting mixture was blended in a sigma blade double arm mixer with 55 grams of "Waterpoxy" M205 (a liquid bisphenol A epichlorohydrin based epoxy resin described in General Mills Bulletin A23822A of May 1, 1970) 1.37 grams nickel chloride imidazole catalyst, 250 grams of water and 70 grams of glycerin to form a plastic mass.

The plastic mass was formed into a number of right cylinder blocks in a die, using a simple plunger and 2-½ inch die cavity. The die was heated to about 95° C. and the plastic mass charged into the heated die. A pressure of approximately 2000 pounds per square inch was applied to the plunger, and the pressure and temperature were held approximately three minutes. The cylinder blocks were then ejected from the die and dried in an air circulating oven at 150° F. for 30 hours. After the drying, resulting cylinder blocks were approximately 1¼ inch in height.

After drying, the green cylinder blocks of green material were very hard and amenable to machining. The green blocks were turned in a lathe to produce true right cylinders and then drilled with non-connecting blind holes forming 19 filtration cavities ¼ inch in diameter and ¾ inch deep and 36 blind drainage cavities 3/32 inches in diameter and ¾ inch deep in the porous cylinder. The filtration cavities were drilled in a hexagonal pattern on 0.362 inch centers and the blind drainage cavities were drilled on vertical axis equidistant from the vertical axes of the three nearest filtration cavities. The blocks were heated, in an air atmosphere, to 700° F. in four hours and held at 700° F. for three hours to remove the binder. The shaped green cylinder blocks were then sintered in a hydrogen atmosphere with a dew point of −40° F. for two hours at 1350° C.

The resulting extended surface area filters were each approximately one inch in height and 2 ¼ inches in diameter. The bubble points of the extended surface filters gave absolute micronic ratings ranging from 60 to 70 microns.

This filter showed its superior rigidity to high pressure filtration when compared with a metallurgically integral filter having a plurality of protruberances and similar in design to that disclosed in co-pending application, Ser. No. 135,638, filed April 20, 1971. The filter with protuberances failed at a hydrostatic pressure of approximately 500 pounds per square inch. The filter of this invention prepared as described above, having substantially the same extended filtration area, showed no deflection at pressures in excess of 1500 pounds per sauare inch, and showed little deflection even at 4150 pounds per square inch of hydrostatic pressure at which point the hydrostatic test was terminated without failure.

EXAMPLE 2

Glass beads having an average particle diameter of 470 microns were coated with an epoxy resin ("Scotchkote" 112) according to the method disclosed in U.S. Pat. No. 3,175,935, issued March 30, 1965 to R. C. Vanstrum. The resin-coated beads were poured into a 2 ½ inch diameter cylindrical pressing die which had been coated with peanut oil as a mold release agent. A pressure of 4000 psi and temperature of 160° F. was applied to the glass beads for several minutes resulting in a 2 ½ inch diameter right cylinder two inches high.

The right cylinders were transferred to an air oven and heated to 375° F. for one-half hour to cure the epoxy. The firmly bonded permeable rigid structure was machined in accordance with Example 1, the resulting extended surface filter having a micronic rating of approximately 110 microns.

EXAMPLE 3

A filter was made using glass beads with an average diameter of 200 microns, following the procedure of Example 2. A micronic rating of approximately 56 microns was obtained for the resulting filter.

EXAMPLE 4

An extended surface area filter was prepared by mixing 300 grams −28+48 mesh aluminum ("Alcoa T-61"), 700 grams of "Alcoa A-2" alumina, and 70 grams of "Methocel". The resulting mixture was blended as in Example 1 with 84 grams glycerin, 340 grams of water, 77 grams "Waterpoxy" M205 and 1.94 grams of nickel chloride imidazole catalyst to form a plastic mass.

The plastic mass was formed, treated and machined the same as in Example 1 and the resulting green, shaped extended surface filter was fired in air atmosphere according to the heating schedule of Table 1 to provide an embodiment of the filter structure of this invention.

TABLE 1

| Operation | Time (hours) |
| --- | --- |
| Room temperature to 200° C. | 1 |
| hold 200° C. | 1 |
| 200° to 400° C. | 2 |
| 400° to 500° C. | 3 |
| 500° to 950° C. | 3 |
| 950° to 1000° C. | 1½ |
| 1000° to 1200° C. | 10 |
| 1200° to 1550° C. | 1½ |
| hold 1550° C. | 6¾ |

Various modifications and alternations of this invention will become apparent to those skilled in the art without departing from the scope and spirit of this invention, and it should be understood that this invention is not to be unduly limited to the illustrative embodiments set forth herein. What is claimed is:

1. A unitary, rigid filter structure comprising a permeable block of consolidated, particulate material free of protuberances and having a top surface with a plurality of blind filtration cavities vertically extending into the block from inlet openings located wholly in said top surface, and an opposing surface with a plurality of blind drainage cavities vertically extending into the block from outlet openings located wholly in said opposing surface, said cavities being spaced apart from one another and spaced from the vertical outer periphery of said block.

2. The filter according to claim 1 wherein said porous material comprises sintered powdered stainless steel.

3. The filter according to claim 1 wherein said particulate material comprises epoxy bonded glass beads.

4. The filter according to claim 1 wherein said particulate material comprises sintered powdered ceramic material.

5. A unitary, uniformly permeable filter structure comprising a cylindrical, permeable block of consolidated, sintered powdered metal with a base portion having a cross-sectional area greater than one square inch in minimum dimension, said base having a plurality of blind drainage cavities vertically extending into the block from outlet openings located wholly in the bottom surface of said block, and having an opposed extended area filtration surface defined by a plurality of blind filtration cavities vertically extending into the block from inlet openings located wholly in the top surface of said block, said cavities being spaced apart from one another and spaced from the vertical outer periphery of said block, said block being free of protuberances.

6. A filtration assembly comprising in combination: a housing having an inlet and outlet with a filter chamber disposed within said housing, a unitary, rigid, filter structure disposed within said filter chamber, said filter structure comprising a permeable block of consolidated, particulate material having a top surface with a plurality of blind filtration cavities extending into the block from inlet openings located wholly in said top surface, and an opposing surface with a plurality of blind drainage cavities extending in the block from outlet openings located wholly in said opposing surface, said filtration cavities being in communication with said inlet via said inlet openings and said drainage cavities being in communication with said outlet via said outlet openings, said block being free of protuberances, and said cavities being spaced apart from one another and spaced from the vertical outer periphery of said block.

7. A unitary, rigid filter structure comprising a permeable block of consolidated, particulate material free of protuberances and having a top surface with a plurality of blind filtration cylindrical chambers vertically extending therefrom into the block and an opposing surface with a plurality of blind drainage cylindrical chambers vertically extending therefrom into the block.

* * * * *